United States Patent
Nieding et al.

(10) Patent No.: US 10,180,205 B2
(45) Date of Patent: Jan. 15, 2019

(54) SEWER REHABILITATION METHOD

(71) Applicant: I.S.T. Innovative Sewer Technologies GmbH, Bochum (DE)

(72) Inventors: Tim Nieding, Bad Hersfeld (DE); Jorg Vogt, Bochum (DE)

(73) Assignee: I.S.T. INNOVATIVE SEWER TECHNOLOGIES GMBH, Bochum (DE)

( * ) Notice: Subject to any disclaimer, the term of this patent is extended or adjusted under 35 U.S.C. 154(b) by 0 days.

(21) Appl. No.: 14/901,219

(22) PCT Filed: Jun. 26, 2014

(86) PCT No.: PCT/EP2014/063496
§ 371 (c)(1),
(2) Date: Dec. 28, 2015

(87) PCT Pub. No.: WO2014/207092
PCT Pub. Date: Dec. 31, 2014

(65) Prior Publication Data
US 2016/0369929 A1    Dec. 22, 2016

(30) Foreign Application Priority Data

Jun. 26, 2013  (DE) .......................... 10 2013 010 584

(51) Int. Cl.
*F16L 55/18*    (2006.01)
*E03F 3/06*    (2006.01)
(Continued)

(52) U.S. Cl.
CPC ............. *F16L 55/18* (2013.01); *F16L 55/265* (2013.01); *F16L 55/28* (2013.01); *E03F 7/00* (2013.01)

(58) Field of Classification Search
CPC ... G02B 6/50; H02G 1/08; H02G 9/06; E21D 9/005; F16L 1/028; F16L 1/26;
(Continued)

(56) References Cited

U.S. PATENT DOCUMENTS 4,298,296 A * 11/1981 Hanson .................... F16L 1/038
134/166 R
4,507,019 A *  3/1985 Thompson .............. E21B 7/046
138/97

(Continued)

FOREIGN PATENT DOCUMENTS

DE         3730315 A1     3/1989
DE        19819406 C2    11/1999
(Continued)

OTHER PUBLICATIONS

International Search Report of the International Searching Authority issued in the corresponding PCT International Application No. PCT/EP2014/063496, dated Jan. 12, 2014, 6 pages.

(Continued)

*Primary Examiner* — Benjamin F Fiorello
*Assistant Examiner* — Edwin J Toledo-Duran
(74) *Attorney, Agent, or Firm* — Raymond R. Ferrera; Adams and Reese LLP

(57) ABSTRACT

The invention relates to a sewer rehabilitation method, wherein a rehabilitation tool (5) is introduced, by means of a robot (2) that can be moved in a sewer main line (3) of a sewerage system, into a house sewer line (9) leading into said sewer main line (3), rehabilitation work is carried out in the house sewer line (9) by means of the rehabilitation tool (5), and the rehabilitation tool (5) is removed from the house sewer line (9) by means of the robot (2) once rehabilitation work is completed. The aim of the invention is to provide a viable and cost-effective sewer rehabilitation method and (Continued)

Figure 1A:
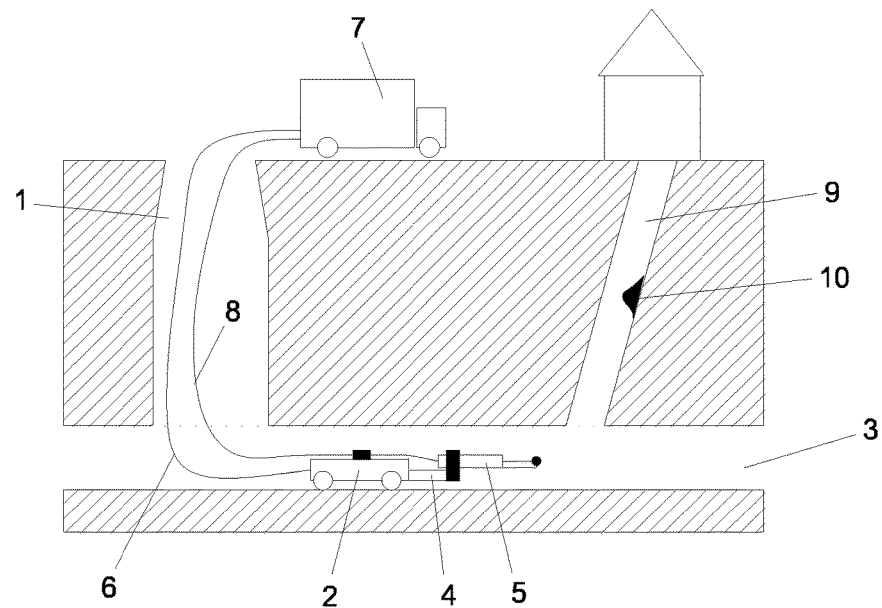

corresponding system enabling sewer rehabilitation work being carried out in the house sewer line (9) starting from the sewer main line (3). For this purpose, the robot (2) picks up the rehabilitation tool (5) and transports it through the sewer main line (3) to the mouth of the house sewer line (9), introduces the rehabilitation tool (5) into the house sewer line (9) and puts it down, advances the rehabilitation tool (5) in the house sewer line (9) up to a defective point (10) and retracts the tool from the house sewer line (9) and picks it up again once rehabilitation work is completed. The invention further relates to a sewer rehabilitation system comprising a robot (2) that can be moved in a sewer main line (3) of a sewerage system and a rehabilitation tool (5) that can be introduced into a house sewer line (9), the robot (2) having a remotely controllable gripping member (4) with which the rehabilitation tool (5) can be gripped.

4 Claims, 2 Drawing Sheets

(51) Int. Cl.
  *E03F 5/00* (2006.01)
  *E03F 3/00* (2006.01)
  *F16L 55/26* (2006.01)
  *F16L 55/28* (2006.01)
  *E03F 7/00* (2006.01)

(58) Field of Classification Search
  CPC ..... F16L 55/18; F16L 55/165; F16L 55/1658; F16L 1/06; F16L 1/201; E03F 2003/065
  USPC .................. 405/183.5–184.3, 154, 156, 157; 264/516, 512, 36, 269, 563, 564, 515, 264/173, 209.2, 209.3, 31, 33, 35, 514, 264/570, 573; 425/262, 13, 326.1, 376.1, 425/380; 156/94, 287, 294; 138/97, 145, 138/DIG. 10
  See application file for complete search history.

(56) References Cited

U.S. PATENT DOCUMENTS

| | | | | |
|---|---|---|---|---|
| 4,691,728 A * | 9/1987 | Mathison | .......... | F16L 55/16455 137/15.11 |
| 4,819,721 A * | 4/1989 | Long, Jr. | .................. | E03F 3/06 166/55 |
| 5,018,545 A | 5/1991 | Wells | | |
| 5,044,824 A * | 9/1991 | Long, Jr. | .................. | E03F 3/06 156/287 |
| 5,104,595 A * | 4/1992 | Hunter | .................. | F16L 55/165 118/DIG. 10 |
| 5,150,989 A * | 9/1992 | Long, Jr. | .................. | E03F 3/06 405/154.1 |
| 5,368,423 A * | 11/1994 | Hanna | ...................... | B23C 3/00 166/55.7 |
| 5,439,033 A * | 8/1995 | Kamiyama | ........... | B29C 63/346 138/97 |
| 5,462,706 A * | 10/1995 | McMillan | ............... | B23B 5/162 156/294 |
| 5,501,115 A * | 3/1996 | Kamiyama | ......... | B29C 63/0052 73/40.5 R |
| 5,598,873 A * | 2/1997 | Kamiyama | ......... | B29C 63/346 138/97 |
| 5,700,110 A * | 12/1997 | Kamiyama | ............. | B29C 53/16 405/184.2 |
| 5,915,886 A * | 6/1999 | McNeil | .................. | E02D 29/12 156/287 |
| 5,916,406 A * | 6/1999 | Kamiyama | ......... | B29C 63/0086 138/97 |
| 5,944,058 A * | 8/1999 | Kamiyama | ........... | F16L 55/265 138/97 |
| 5,960,882 A * | 10/1999 | Polivka | ................. | F16L 55/265 166/297 |
| 6,123,109 A * | 9/2000 | Kamiyama | ........... | F16L 55/265 138/97 |
| 6,969,216 B2 * | 11/2005 | Driver | ................ | F16L 55/1651 138/97 |
| 7,131,791 B2 * | 11/2006 | Whittaker | ................ | E03F 3/06 405/184.2 |
| 9,211,648 B2 * | 12/2015 | Grinstead | .............. | B25J 19/023 |
| 2003/0015247 A1 * | 1/2003 | Driver | ................ | F16L 55/1654 138/98 |
| 2003/0213556 A1 * | 11/2003 | Blackmore | ......... | B29C 63/0069 156/294 |
| 2004/0175235 A1 * | 9/2004 | Whittaker | ................ | E03F 3/06 405/51 |
| 2004/0175239 A1 * | 9/2004 | Pare | ...................... | B05B 7/0408 405/146 |
| 2006/0174957 A1 * | 8/2006 | Blackmore | ............... | E03F 3/06 138/98 |
| 2008/0253843 A1 * | 10/2008 | Kaneta | .................... | B29C 63/36 405/184.2 |
| 2009/0155040 A1 * | 6/2009 | Martin | .................... | B66C 1/427 414/744.8 |
| 2010/0139799 A1 * | 6/2010 | Kamiyama | ........... | F16L 55/163 138/98 |
| 2010/0282351 A1 * | 11/2010 | Kamiyama | ......... | F16L 55/1654 138/98 |
| 2010/0301505 A1 * | 12/2010 | Kiest, Jr. | ............. | F16L 55/1651 264/36.16 |
| 2011/0186205 A1 * | 8/2011 | Kamiyama | ............. | B29C 63/36 156/94 |
| 2012/0118482 A1 * | 5/2012 | Yamane | .................. | B29C 53/78 156/95 |
| 2012/0273078 A1 * | 11/2012 | Hawwa | ................. | F16L 55/163 138/98 |
| 2013/0268118 A1 * | 10/2013 | Grinstead | .............. | B25J 19/023 700/259 |
| 2014/0110006 A1 * | 4/2014 | Bichler | .................... | F16L 55/40 138/97 |
| 2014/0261832 A1 * | 9/2014 | Kiest, Jr. | ........... | F16L 55/16455 138/97 |
| 2015/0184785 A1 * | 7/2015 | Richards, Jr. | ....... | F16L 55/1645 138/97 |
| 2015/0259993 A1 * | 9/2015 | Patel | ........................ | E21B 19/16 175/52 |
| 2016/0061374 A1 * | 3/2016 | Bichler | .............. | G06K 7/10366 138/97 |
| 2016/0273698 A1 * | 9/2016 | Kiest, Jr. | ................ | F16L 55/163 |
| 2016/0303739 A1 * | 10/2016 | Apkarian | .................... | B25J 3/04 |
| 2017/0247959 A1 * | 8/2017 | Dirksen | ................. | E21B 21/103 |

FOREIGN PATENT DOCUMENTS

| | | | | |
|---|---|---|---|---|
| EP | 1070905 A2 * | 1/2001 | ........... | F16L 55/265 |
| EP | 1070905 B1 | 1/2001 | | |
| EP | 2287510 B1 | 2/2011 | | |
| GB | 2147682 A * | 5/1985 | ........... | F16L 55/179 |
| GB | 2147682 B | 5/1985 | | |
| WO | 2012016322 A1 | 2/2012 | | |

OTHER PUBLICATIONS

Written Opinion of the International Search Authority (Form PCT/ISA/237) with English Translation issued in the corresponding PCT International Application No. PCT/EP2014/063496, dated Dec. 1, 2014 (10 pages).

International Preliminary Report on Patentability Chapter I issued in the corresponding PCT International Application No. PCT/EP2014/063496, dated Dec. 29, 2015 (6 pages).

* cited by examiner

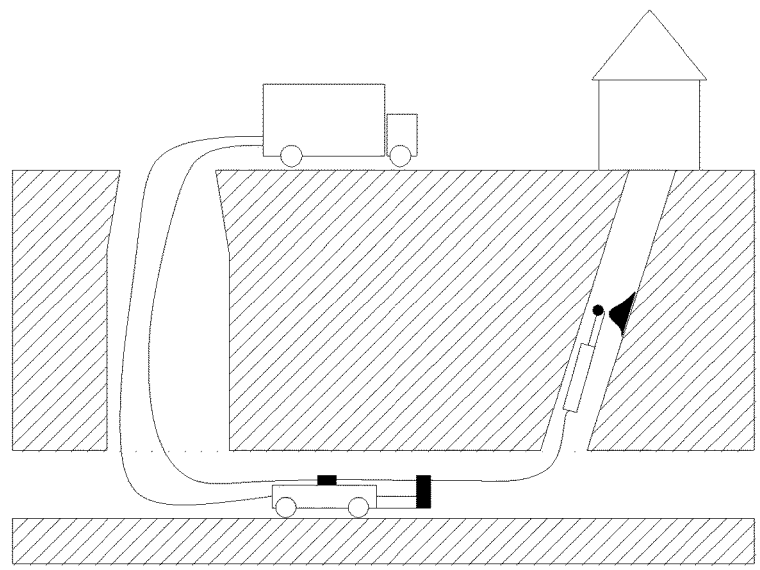
Fig. 1c
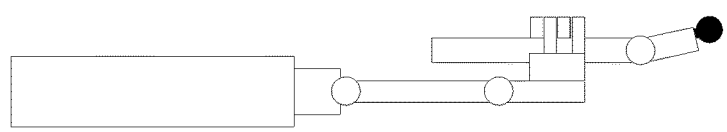

SEWER REHABILITATION METHOD

The invention relates to a sewer rehabilitation method, wherein
- a rehabilitation tool is introduced, by means of a robot that can be moved in a sewer main line of a sewerage system, into a house sewer line leading into said sewer main line,
- rehabilitation work is carried out in the house sewer line by means of the rehabilitation tool, and
- the rehabilitation tool is removed from the house sewer line by means of the robot once rehabilitation work is completed.

Furthermore, the invention relates to a sewer rehabilitation system comprising a robot that can be moved in a sewer main line of the sewerage system and a rehabilitation tool that can be introduced into a house sewer line.

The term of sewer rehabilitation is understood to mean methods, techniques, and measures for restoring or improving existing sewerage systems. Sewers must be so planned, built, maintained and operated that the structural status is sustained over their service life. By way of a sewer rehabilitation, the functional capability of a sewerage system is restored and its service life is extended. Sewer rehabilitation methods cover repair, revamping and renewal methods.

For rehabilitation of house sewer lines, suitable rehabilitation tools, for example a milling tool and/or a lining tool bridging a defective point by means of a so-called hose liner, are conventionally introduced, starting from a house revision shaft. This approach bears a disadvantage in that it requires access to the private property, although in numerous cases the house sewer line leading up to the building falls into the rehabilitation competence of the relevant municipality.

Known from DE 103 11 828 A1 is a sewer rehabilitation method in which a suitable rehabilitation device is introduced from a sewer main line by means of a device that can be moved through the main sewer line to the branch line of the relevant house sewer line. To this effect, the mobile device comprises a deflection channel. The device is fixable in the area of the branch in the sewer main line. By means of the deflection channel, it is possible to introduce rehabilitation tools, rehabilitation material and the like from the sewer main line into the house sewer line in order to perform rehabilitation work required there. An essential point in this prior art sewer rehabilitation method lies in that the mobile device comprises a housing with an inflatable packer, by means of which the transition between the deflection channel and the branch of the house sewer line can be sealed and the mobile device can be fixed.

The mentioned printed publication leaves it open how precisely the rehabilitation tool is introduced through the deflection channel of the mobile device into the house sewer line. A disadvantage with the afore-mentioned sewer rehabilitation method lies in that a special device, that means the movable device with the packer and deflection channel is needed. This implies additional expenditure and accordingly higher cost.

Against this background, it is the object of the present invention to provide a practical and low-cost sewer rehabilitation method and a corresponding system that allow for performing a sewer rehabilitation in a house sewer line by starting from a main sewer line.

This object is achieved by the present invention on the basis of a sewer rehabilitation method of the initially specified type in that the robot
- picks up the rehabilitation tool and transports it through the sewer main line to the mouth of the house sewer line,
- introduces the rehabilitation tool into the house sewer line and puts it down,
- advances the rehabilitation tool into the house sewer line up to a defective point, and
- retracts the rehabilitation tool from the house sewer line and picks it up again once rehabilitation work is completed.

Thus it is the key idea of the present invention to utilize the robot movable in the sewerage system to pick up the rehabilitation tool, and to transport it, for example, from a shaft of the sewer main line through the sewer main line up to the mouth of the house sewer line. Furthermore, the robot introduces the rehabilitation tool into the house sewer line and puts it down there. Moreover, the robot inventively advances the rehabilitation tool in the house sewer line to the defective point to be treated. Finally, the robot again retracts the rehabilitation tool from the house sewer line and picks it up once the rehabilitation work is completed.

Suitable for use as movable robot in the sense of the present invention is a sewer rehabilitation robot of actually known construction type and function. Known from prior art are sewer rehabilitation robots which can be moved in a sewer on wheels driven by means of an electrical, pneumatic or hydraulic motor. Sewer rehabilitation robots of this type are supplied with energy and remotely controlled via a cable from above-ground. They are provided with an electrically, pneumatically or hydraulically driven rehabilitation device, for example a millling head, by means of which the rehabilitation work can be performed in remotely monitored and remotely controlled manner. A video camera integrated into the sewer rehabilitation robot is typically provided for remote monitoring.

Such a sewer rehabilitation robot can inventively be applied, for example by replacing the rehabilitation device with a remotely controllable gripping member which takes-up the rehabilitation tool that is independent from the the robot and which is then introduced by the robot into the house sewer line and put down there. Thus, a conventional sewer rehabilitation robot can be adapted to suit the inventive application at low expenditure.

Suitable for use as rehabilitation tool for the inventive application is a milling robot known from prior art and commercially available which is conventionally utilized for carrying-out milling work, starting from the house revision shaft. Such a milling robot can be utilized inventively without any modifications or adaptations. Likewise, the rehabilitation tool may be an actually known and commercially available lining tool for introduction of a hose liner.

A substantial advantage of the inventive sewer rehabilitation method thus lies in that existing, proven and low-cost devices obtainable on the market can be utilized which just need to be slightly adapted. Inasmuch as a conventional sewer rehabilitation robot and a milling robot are already available, it is merely required to retrofit the sewer rehabilitation robot to be able to accommodate the milling robot. Thus, the inventive sewer rehabilitation method that enables performing rehabilitation work in the house sewer line by starting from the sewer main line can be made available and applied at conceivably low cost.

Preferably, the robot introduces the rehabilitation tool at least 50 cm deep, further preferably at least 1 m deep, especially preferably at least 2 m deep into the house sewer line before it puts it down there. The robot should introduce the rehabilitation tool at least so deep into the house sewer line that it does not fall again out from it into the sewer main line. The remotely controllable gripping member of the robot should be dimensioned accordingly.

In a preferred embodiment, the robot and the rehabilitation tool are supplied with energy and remotely controlled via separate cables from above-ground. As mentioned before, it is common practice for sewer rehabilitation robots of conventional construction type to supply them with energy and control them remotely via cables. In this sense, a cable should be understood to mean any type of a flexible connection that transfers energy and remote control signals. Typically, several lines, that means multicore electrical lines as well as compressed-air lines, if any (in case that pneumatic drives are applied) or hydraulic lines (in case that hydraulic drives are applied) are grouped together in the cable. In accordance with the invention, as mentioned before, a (modified) conventional sewer rehabilitation robot in combination with a conventional milling robot can be applied. Conventional sewer rehabilitation robots and milling robots each comprise an individual cable link connecting to an energy supply and remote control equipment located above ground.

With a preferred embodiment of the inventive sewer rehabilitation method, the robot advances the rehabilitation tool in the house sewer line up to the defective point to be rehabilitated in a manner that it moves backward after putting down the rehabilitation tool in the sewer main line, then grabs the cable of the rehabilitation tool and finally moves forward again in the sewer main line. This procedure can be repeated several times, depending on how far the rehabilitation tool is to be advanced in the house sewer line. On moving backward, the cable of the rehabilitation tool is let loose by the robot. On advancing, the cable of the rehabilitation tool is grabbed in order to transfer the thrust to the rehabilitation tool via the (accordingly flexurally rigid) cable as the robot advances. For grabbing the cable of the rehabilitation tool, the afore-mentioned remotely controllable gripping member of the robot can be used. Other types of a detachable fixation of the cable at the robot are conceivable.

The object of the present invention is furthermore achieved by way of a sewer rehabilitation system that comprises a robot which can be moved in the sewer main line of a sewerage system and a rehabilitation tool which can be introduced into a house sewer line. In accordance with the invention, the robot comprises a remotely controllable gripping member by means of which the rehabilitation tool can be grabbed. The sewer rehabilitation system is suitable for executing the inventive sewer rehabilitation method described hereinabove.

As mentioned before, the robot and the rehabilitation tool can preferably be supplied with energy and remotely controlled via separate cables. Accordingly, not only the rehabilitation tool but also the cable of the rehabilitation tool can be grabbed by the remotely controllable gripping member. This has the advantage that the gripping member can be utilized on the one hand for transporting the rehabilitation tool through the sewer main line up to the house sewer line mouthing into the sewer main line, and on the other hand for advancing the rehabilitation tool in the house sewer line in a manner, as described above, that the robot grabs the cable of the rehabilitation tool and transfers a thrust via the flexurally rigid cable onto the rehabilitation tool by advancing in the sewer main line.

With a preferred embodiment of the inventive sewer rehabilitation system, a cable duct is provided for which guides the cable of the rehabilitation tool at the robot. The cable duct ensures that the cable of the rehabilitation tool is not damaged, for example due to a contact with the drive wheels of the robot. Besides, the cable duct assures that the cable of the rehabilitation tool can be grabbed reliably and securely by the gripping member of the robot for advancing the rehabilitation tool in the house sewer line.

With another preferred embodiment, the gripping member of the robot comprises a claw-type gripper provided with gripping claws that move toward and away from each other. A claw-type gripper is suitable for grabbing most different objects with most different dimensions. Thus, a claw-type gripper can be applied with special flexibility. In particular, a claw-type gripper is well suitable on the one hand for grabbing the rehabilitation tool in order to transport it up to the mouth of the house sewer line and to introduce it into the house sewer line according to the present invention, and on the other hand for grabbing the cable of the rehabilitation tool in order to advance it in the house sewer line. With special preference, the claw-type gripper comprises two interlockable groups of gripping claws, wherein at least one group comprises at least two gripping claws. Preferably, both groups comprise two (or more) gripping claws which are mounted in staggered arrangement toward each other so that in interlocked status they overlap each other at least partly in a direction perpendicular to the plane of movement of the gripping claws. The interlockable groups of gripping claws have the advantage that objects having clearly different diameters can be grabbed thereby reliably with sufficient high gripping force. On the one hand, the rehabilitation tool can be retained reliably and securely. On the other hand, the cable of the rehabilitation tool can be grabbed with sufficient firmness so that the thrust required for advancing the rehabilitation tool in the house sewer line can be transferred from the robot to the cable.

Figure 1B:
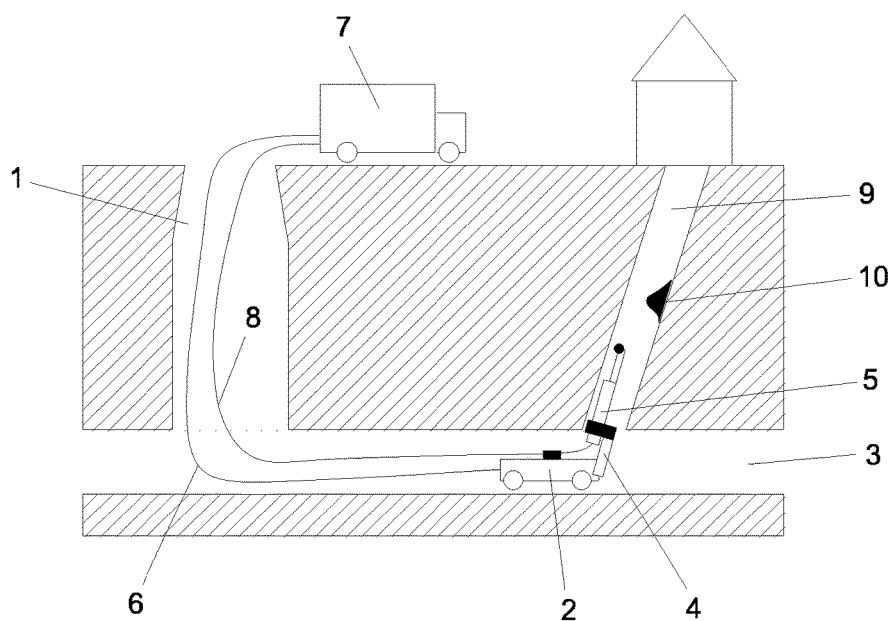

Practical examples of the invention are elucidated in the following by way of drawings, where:

FIGS. 1a-1c: show a schematic view of the inventive method; and

FIG. 2: is a schematic view of the inventive sewerage rehabilitation system with a mobile robot and milling tool;

FIGS. 1a to 1c illustrate the inventive sewer rehabilitation method schematically. A robot 2 is introduced through a shaft 1 into a sewer main line 3 of a sewerage system. Robot 2 comprises a gripping member 4 whose configuration is described further below in greater detail. By means of gripping member 4, robot 2 holds a milling tool 5. Robot 2 is linked via a cable 6 to a vehicle 7 located above ground. Vehicle 7 is provided with facilities for remote control and energy supply of robot 2. Via a cable 8 provided separately from cable 6, the milling tool 5 is linked to vehicle 7 so that also the energy supply and remote control of milling tool 5 proceed from vehicle 7. Robot 2 can be moved via motor-driven wheels in the sewer main line 3 and transports milling too 5 through sewer main line 3 to a house sewer line 9 leading into sewer main line 3. As illustrated in FIG. 1b, robot 2 introduces milling tool 5 by means of its gripping member 4 into house sewer line 9 and puts it down there. It means that the gripping member 4 of robot 2 releases the milling tool 5 in the house sewer line 9. When robot 2 has put down the milling tool 5 in the house sewer line 9, it moves backward in the sewer main line 3. Then it grabs cable 8 of milling tool 5 and again advances in sewer main line 3. Via the flexurally rigid cable 8, thrust is transferred to milling tool 5 so that it is advanced in the house sewer line 9 up to a defective point 10 that requires treatment. Upon its arrival at the defective point 10, the milling tool 5, remotely controlled from vehicle 7, performs the milling work required for rehabilitation. For this purpose, the milling tool 5 like robot 2, too, comprise a video camera (not illustrated here). Via the video camera of robot 2 and milling tool 5, the movements of robot 2 in the sewer main line 3 and the movements of milling tool 5 in the house sewer line 9 can be monitored from vehicle 7 in order to remotely operate robot 2 and milling tool 5 independently of each other. Upon completion of the milling work, robot 2 retracts the milling tool 5 from the house sewer line 9 back to the mouth of the house sewer line 9 into the sewer main line 3 (not illustrated here) until robot 2 can again pick up the milling tool 5 by means of its gripping member 4.

Subsequently, robot 2 transports the milling tool 5 back to shaft 1 where it can be taken out from the sewerage system together with robot 2.

FIG. 2 shows the inventive sewer rehabilitation system in greater detail. The system comprises the robot 2 which can be moved in the sewer main line 3 via motor-driven (e.g. pneumatically) wheels 11. At its front side, robot 2 comprises a bearing block 12 that is motorically rotatable about axis M. Arranged at the bearing block 12 is a jib 14 that can be motorically slewed about an axis 13. Arranged at the end of jib 14 is a claw-type gripper 16 that can be motorically slewed about another axis 15. The claw-type gripper 16 holds the milling tool 5, as illustrated in FIG. 2. The bearing block with the jib 14, slewing axes 13 and 15 and with the claw-type gripper 16 form the gripping member 4 of robot 2. The jib 14 is amply sized so that the milling tool 5 can be introduced by robot 2 at least 50 cm, better at least 1 m deep into the house sewer line 9 before it can be put down there. Otherwise there is a risk that the milling tool 5 falls out after having been put down in the sewer main line 3. Owing to the rotatability of bearing block 12 and because of slewability about both axes 13 and 15, it results a high mobility of the gripping member 4 so that the milling tool 5 can be introduced reliably into the sewer main line 9, i.e. practically for every geometry of the mouth of the house sewer line 9 leading into the sewer main line 3. Cable ducts 17 are provided at the housing of robot 2 which guide the cable 8 of milling tool 5 at robot 2. Cable ducts 17 ensure that cable 8 does not get in contact with the wheels 11 of robot 2 whereby it could be damaged. Furthermore, the cable duct 17 assures that the cable 8 for advancing of the milling tool 5 in the house sewer line 9 can be securely grabbed by the claw-type gripper 16.

Claw-type gripper 16 comprises gripping claws 18, 19 that can be moved toward and away from each other. The gripping claws 18 and 19 each form a group of interlockable gripping claws. The gripping claws 18, 19 in interlocked status in which the gripping claws partly overlap each other. To allow for movement toward and away from each other, the gripping claws 18 are slewable about a slewing axis 20 and the gripping claws 19 are slewable about a slewing axis 21. Because of the interlockability of gripping claws 18, 19, objects with substantially different diameter can be grabbed. This is important because by means of the claw-type gripper 16 it is feasible to grab both the milling tool 5 and the cable 8 of the milling tool 5 reliably and with sufficient gripping force.

The invention claimed is:

1. A sewer rehabilitation method, said method comprising:
    Introducing a rehabilitation tool by means of a robot that can be moved in a sewer main line of a sewerage system into a house sewer line leading into said sewer main line;
    Carrying out rehabilitation work in the house sewer line by means of the rehabilitation tool; and
    Removing the rehabilitation tool from the house sewer line by means of the robot once rehabilitation work is completed,
    Wherein use of the robot further comprises:
        Picking up the rehabilitation tool and transporting the rehabilitation tool through the sewer main line to a mouth of the house sewer line,
        Introducing the rehabilitation tool into the house sewer line and putting the rehabilitation tool down,
        Advancing the rehabilitation tool into the house sewer line up to a defective point by moving backward in the sewer main line after putting down the rehabilitation tool, and then grabbing a cable of the rehabilitation tool and gripping the cable sufficiently tightly that a pushing force required to push the rehabilitation tool in the house sewer line can be transferred from the robot to the cable, and then moving forward again in the sewer main line, and
        Retracting the rehabilitation tool from the house sewer line and picking the rehabilitation tool up again once rehabilitation work is completed.

2. The sewer rehabilitation method according to claim 1, further comprising using the robot to introduces the rehabilitation tool at least 50 cm deep into the house sewer line.

3. The sewer rehabilitation method according to claim 1, further comprising supplying the robot and the rehabilitation tool with energy and remotely controlled via separate cables from above-ground.

4. The sewer rehabilitation method according to claim 1, further comprising equipping the robot with a remotely controllable gripping member to pick-up the rehabilitation tool.

* * * * *